United States Patent [19]

Selker et al.

[11] Patent Number: 5,521,596
[45] Date of Patent: May 28, 1996

[54] ANALOG INPUT DEVICE LOCATED IN THE PRIMARY TYPING AREA OF A KEYBOARD

[75] Inventors: Edwin J. Selker, New York; Joseph D. Rutledge, Mahopac, both of N.Y.

[73] Assignee: Lexmark International, Inc., Greenwich, Conn.

[21] Appl. No.: 915,704

[22] PCT Filed: Nov. 29, 1990

[86] PCT No.: PCT/US90/06831

§ 371 Date: Jul. 29, 1992

§ 102(e) Date: Jul. 29, 1992

[87] PCT Pub. No.: WO92/09996

PCT Pub. Date: Jun. 11, 1992

[51] Int. Cl.$^6$ ................................................. H03K 17/94
[52] U.S. Cl. .......................... 341/22; 341/20; 345/161; 345/168
[58] Field of Search ............... 341/20, 22; 345/157, 345/161, 168, 160

[56] References Cited

U.S. PATENT DOCUMENTS

| 3,772,597 | 11/1973 | Stover . | |
|---|---|---|---|
| 4,246,452 | 1/1981 | Chandler | 200/6 A |
| 4,313,113 | 1/1982 | Thornburg | 340/709 |
| 4,313,227 | 1/1982 | Eder | 345/161 |
| 4,575,591 | 3/1986 | Lugaresi | 200/6 A |
| 4,680,577 | 7/1987 | Straayer et al. | 345/160 |
| 4,736,191 | 4/1988 | Matzke et al. . | |
| 4,825,019 | 4/1989 | Fisher | 200/6 A |
| 4,899,137 | 2/1990 | Behrens et al. | 340/711 |
| 4,931,781 | 6/1990 | Miyakawa . | |
| 4,937,564 | 6/1990 | Oberg . | |
| 4,949,080 | 8/1990 | Mikan | 345/161 |
| 5,021,771 | 6/1991 | Lachman | 341/22 |
| 5,034,574 | 7/1991 | Martovitz | 200/6 A |

FOREIGN PATENT DOCUMENTS 57-10832   1/1982   Japan .

OTHER PUBLICATIONS

IBM Technical Disclosure Bulletin, vol. 21, No. 8, Jan. 1979, "Single Keybutton Four–Way Switch" W. C. McCornack.

IBM Technical Disclosure Bulletin, vol. 26, No. 7B, Dec. 1987, "Single–Key Curser Control", Truelson, pp. 3746–3747.

IBM Technical Disclosure Bulletin, vol. 28, No. 5, "Smart Key", Oct. 1985, pp. 1859–1860.

IBM Technical Disclosure Bulletin, vol. 29, No. 7, "Split Keyboard" Dec. 1986, p. 3110.

Primary Examiner—John K. Peng
Assistant Examiner—Andrew Hill
Attorney, Agent, or Firm—Sughrue, Mion, Zinn, Macpeak & Seas

[57] ABSTRACT

A sensor device is placed either underneath a key cap of a key on a keyboard or in between two keys on a keyboard so that cursor movement may be carried out from the keyboard itself. If the sensor device is placed underneath a key cap, then the key cap is a manual cursor controller. If, on the other hand, the sensor device is placed in between two keys, a joystick is used as a manual cursor controller.

15 Claims, 2 Drawing Sheets

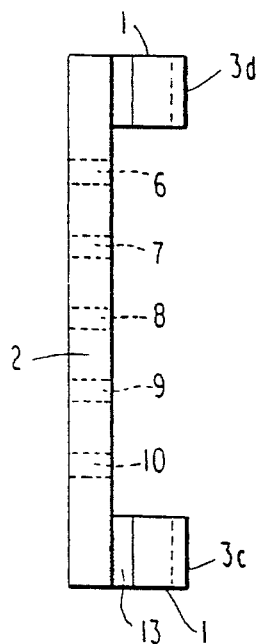
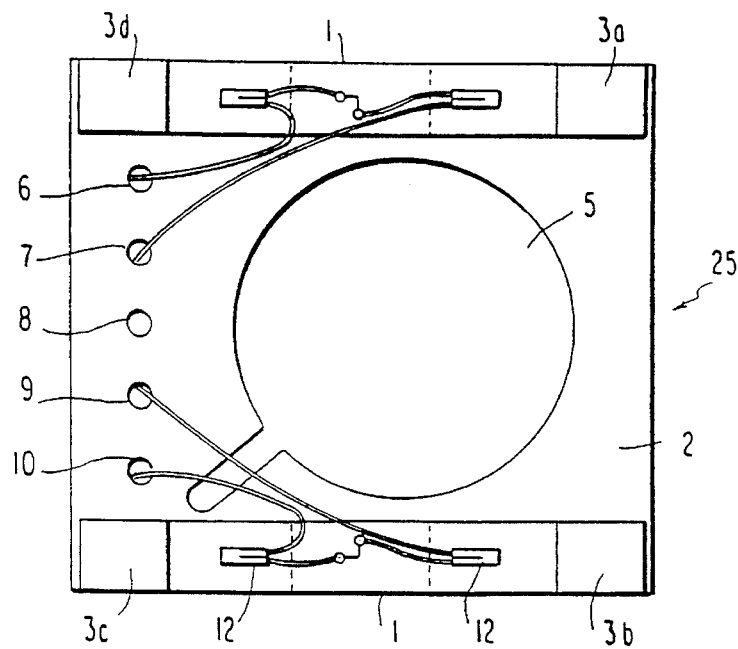
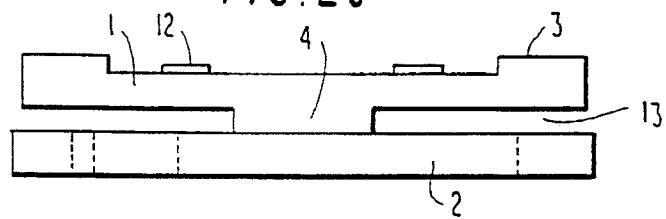
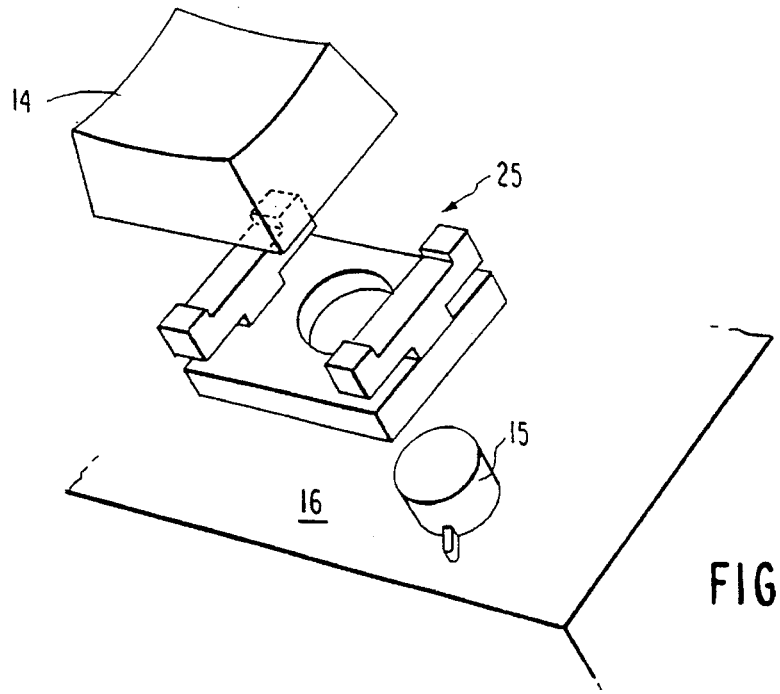

ANALOG INPUT DEVICE LOCATED IN THE PRIMARY TYPING AREA OF A KEYBOARD

FIELD OF THE INVENTION

The present invention relates to the field of analog input devices for inputting information into a computer.

BACKGROUND OF THE INVENTION

Analog input devices for inputting information into a computer are used to enter discrete information by pressing, for example, discrete, binary keys. Also, analog input devices may be used as pointing devices to enter one or more channels of analog information, such as, for example, information relating to the force applied to an analog pointing device, such information to be used, for example, to control the position or velocity of a cursor on an associated computer monitor screen.

The present invention relates specifically to analog input devices for performing a class of mixed tasks in which an operator wishes to enter both discrete information by pressing discrete binary keys and, at almost the same time, or in rapid alternation, to enter one or more channels of analog information. Typical examples of such a class of mixed tasks include:

1. text editing on a computer, alternating focusing on a point on the screen with entering or deleting text at that point.

2. air traffic control-like applications, in which a point on the screen is selected for read-out or entry of data.

3. menu-driven computer applications, in which selection from a menu alternates with selection of points on the screen remote from the menu, and data entry at those points.

For this class of tasks it is common to use an analog pointing device, for example, a mouse, which is located on a separate surface immediately adjacent to a discrete binary keyboard input device. The analog pointing device is moved around on the surface and a cursor is correspondingly moved around a computer screen.

Since the analog pointing device is not in the primary area of the keyboard, the operator is required to move his/her hand back and forth between the keyboard and the pointing device, with significant resulting delay and distraction.

In order to reduce the time involved in the back and forth motion of an operator's hand between the typing keyboard and the analog pointing device, various approaches for combining the typing keyboard and the pointing device have been proposed. One such approach involves the dual use of standard keys on the keyboard as cursor control keys. In order to tell the standard keys to function as cursor control keys, a mode control switch, such as a SHIFT key, had to be hit. If the mode control switch was not hit, then the keys would operate in a normal manner to input an appropriate character into the computer. This approach proved unsatisfactory in the art because of the mental load imposed on an operator in remembering which standard keys will perform which cursor control operation.

Once the above-mentioned approach was abandoned, separate cursor control keys became almost universal. However, with the separate cursor control keys, only limited cursor control can be accomplished, as compared to using a mouse, since the cursor control keys operate in a discrete binary manner.

Another approach involved an analog input device located within or immediately adjacent to the standard keyboard area, but located separate from the standard keys. Within this class are various proposed and commercial devices intended to be operated by the thumb, and located below the space bar. A common restriction on all of these devices is the severely limited space available in the standard keyboard area.

The next step of development involved placing sensors, such as strain gauge sensors, adjacent to a particular standard key on the keyboard as described in U.S. Pat. No. 4,680,577 to Straayer et al. With such an arrangement, when the key is pressed in a normal direction, i.e., vertically downwards and perpendicular to the key cap surface, the key performs its normal function of inputting a specific character. However, if the key is moved horizontally or vertically, i.e., parallel to the key cap surface, then the strain gauge sensors sense such motion and the cursor is correspondingly moved on the screen.

A problem, however, has existed with respect to the analog input device constructed in accordance with the U.S. Patent cited above. Specifically, a different key structure must be substituted for an original key structure in order to use the key as both a data entry device and an analog pointing device. More specifically, a key structure which enables the use of the required sensors is needed. Thus, it is difficult to retrofit an existing keyboard to make use of the cursor control function. Another problem with this device is that only two degrees of freedom, that is, vertical and horizontal (y and x), of the key are allowed to be sensed. Furthermore, the cursor is constrained to be controlled only by a data entry key.

SUMMARY OF THE INVENTION

One object of the present invention is to combine an analog pointing device and a data entry device into the same area in such a way that an existing data entry device may be easily retrofitted to produce the data entry device/analog pointing device combination.

A second object of the present invention is to combine an analog pointing device and a data entry device into the same area in such a way that the keys of the data entry device are not necessarily constrained, as in the conventional devices mentioned above, to be used as the analog pointing device. Instead, the analog pointing device may be located between the keys of the data entry device.

A third object of the present invention is to combine an analog pointing device and a data entry device into the same area in such a way that more than two degrees of freedom of pointing device movement may be sensed, thus, allowing for increased control of cursor movement.

The above objects are attained by providing a generally rectangular shaped sensor assembly, including a plurality of sensors, which may be placed either directly underneath an existing key of a data entry device or in between two keys of a data entry device. When the sensor assembly is placed underneath an existing key, the key is used as the analog pointing device. When the sensor assembly is placed in between two keys, a separate joystick is used as the analog pointing device.

The sensors in the sensor assembly are arranged in such a way that they can sense up to six degrees of freedom of the analog pointing device. Specifically, these degrees of freedom are the x, y and z axial directions as well as the rotational directions around these x, y and z axial directions.

BRIEF DESCRIPTION OF THE DRAWINGS

FIGS. 2a through 2d show another embodiment of a sensor apparatus of the present invention, such an apparatus being of a cantilever type;

DETAILED DESCRIPTION OF THE PREFERRED EMBODIMENTS

Figure 1A:
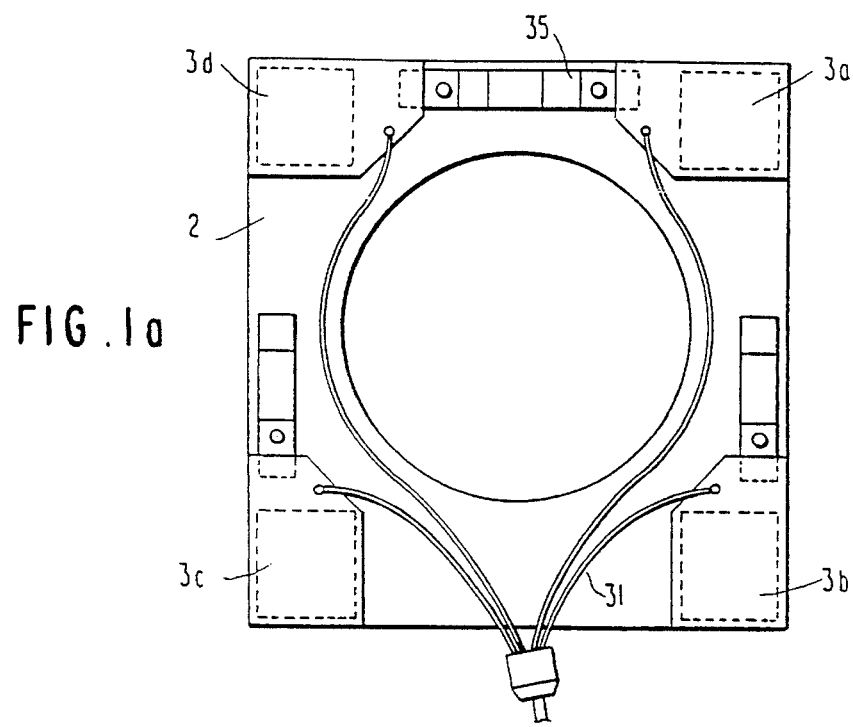
FIGS. 1a and 1b show one embodiment of a sensor apparatus of the present invention, such an apparatus being of a direct compression type.

A key in a normal keyboard is a rigid object with six degrees of freedom, which may be thought of as a force vector and a torque vector, each of three components. In its normal function, as a data entry device, the key responds to one component of the force vector, say the z component, perpendicular to the plane of the keyboard; it is constrained in the other five components. These are therefore available for analog input, provided the resultant displacement of the key does not result in interference between adjoining keys. Using techniques such as those disclosed below, forces and torques can be measured with displacements small compared to the tolerances and spacings ordinarily found in keyboards, making five analog quantities available in principle. In addition, the z component is available to a limited extent, since when the key is at one or the other limit of its travel additional force in that direction has no effect on its normal function and may be used as an analog input; once the key is fully depressed, additional downward force may be measured and used.

On the other hand, the integral spacing of the usual keyboard makes it impractical for the fingers of the operator to grasp a key, so attention may be restricted to forces applied to a key by a single fingertip applied to the top surface, which however may be shaped (cupped, ridged etc) to facilitate the transmission of a wider range of forces. It seems clear, however, that the applied force must have a significant component in the $-z$ (down) direction, and that any applied torque must be accompanied by such a force (to establish frictional purchase). Since the useful range of forces/torques must extend well above threshold for fingertip detection, and the force threshold, the point where enough force has been applied to tell the key to enter data, for the primary key operation is within a small factor of that threshold, it can be assumed that useful analog input will occur only in a state with the key in its 'down' position, and with an applied force having a $-z$ component greater than the operating threshold of the key. In the following discussion attention will be focused on the measurement of applied forces with a $-z$ component greater than the key operating threshold and to applied torques about the z axis. However, it is within the contemplation of the invention to include all six degrees of freedom.

Thus, four independent analog quantities may be entered through a suitably modified key in a normal keyboard, in addition to its normal key entry function (although not necessarily simultaneously). The common analog input devices used with personal computers (mouse, joystick, trackball, touch screen, lightpen, etc.) provide two such quantities; to replace their function, two is sufficient, and one may argue from the absence in common use of higher-dimensional input devices that there is little or no application for them. Nevertheless, implementations are given which provide all four quantities, as well as simpler ones which are restricted to two.

To use a key for analog input, two approaches are distinguishable:

1. substitute a different structure for a key, which will be sufficiently similar to the original key for normal key entry purposes but which embodies the required additional sensors (this approach is used in the Straayer et al U.S. Pat. No. 4,680,577);

2. add sensors to the key and/or keyboard without interfering with the operation of the key. Approach 2 has the advantage that, when applicable, it can be used to retrofit existing keyboards with minimal expense and effort.

The above analysis treats the key as if constrained at its 'center of mass', and thus equivalent to a free body. The actual constraint system is more complicated, and differs radically between keyboards. Typically the key is constrained by a sliding cylindrical bearing ('loose bearing') which allows free movement over a range of perhaps 0.2 inches in the z direction and small movements, on the order perhaps of 0.01 inches, in the other (5) degrees of freedom. An alternative, not observed in current personal computer keyboards, would be a 'tight bearing' with the same freedom of movement in the z direction but no significant freedom in any other. The implementation of the measurement system must be adapted to the type of constraint; generally, the small movements of a 'loose bearing' key may be further constrained and measured to determine forces on it, while for a 'tight bearing' key it is necessary to measure strains in the key's own constraint system.

A general class of implementations takes the key as a rigid body, and applies constraints to it, with means to measure forces on the constraints resulting from forces and torques applied to the key. A useful subclass applies the constraints only when the key is in its 'depressed' position. A subclass of these, in turn, may be characterized as implementations in which the key is a truncated rectangular pyramid, with the base downward and parallel to the plane of the keyboard, and with its 'normal' key-function movement roughly normal to that plane. A sensing chip, to be described below, is placed so that at the bottom of the key's travel, and just before reaching any other stop, the four corners of the base of the key come to rest on 'anvils' placed on the four corners of the chip, which constrain its further motion. Any force vector now applied to the top surface of the key which passes through the base will result in force on each of the anvils with a positive downward component. If the downward component on each anvil is measured (4 quantities), a 3-vector is (over-)determined which measures the force applied to the top of the key in magnitude and direction. Any additional measurement(s) of force on the anvils in a horizontal direction will yield the torque about the vertical (z) axis.

The above discussion implicitly assumes that the key's normal constraint system may be disregarded. Assuming that this constraint system is a sliding cylindrical bearing with a vertical axis of motion ('loose bearing' case above), its action in the region of interest may be analyzed, when the key is near but not at its maximum downward excursion, its bottom surface having come in contact with the sensing chip. The four anvils have a small and approximately equal compliance, such that the key, in contact with them, can move through distances which are small compared to the tolerances of its normal constraint system. Any such motion can be analyzed as a composition of a vertical motion, a rotation about a horizontal axis, and a rotation about a vertical axis. For the applied forces of interest (vector force applied to top surface of the key and passing through its base, plus rotation about its vertical axis) the horizontal axis of rotation may be taken as passing through the point of contact of the key constraint (at the upper end of the bearing) and the vertical axis as the vertical axis of the key, with negligible error (to be demonstrated). This justifies the neglect of the bearing as affecting the analog input for the purposes of human input with immediate feedback, though not for precise measurement purposes.

A class of implementations can be characterized as consisting of a sensing unit (chip) which fits between the base of the key and the keyboard base (with required cutout for the bearing structure of the key), and carrying on its four corners sensing devices (load cells) capable of transducing at least vertical and perhaps horizontal forces applied to them into electrical or other signals, together with signal processing means, located either locally or remotely or both, to transform these signals into signals appropriate for input to an associated computer, or other intended application. In a homologous class of implementations, the load cells are mounted on the keyboard base (i.e. the structure with respect to which the key moves) which then replaces the structural function of the chip. These implementations share the advantage that they can be added to an existing keyboard with little or no modification of the keyboard itself, or even in most cases of the individual key, and retain unaltered the typing action and feel of the keyboard.

Now, a description of the load cells will be given. A number of different implementations are disclosed. For the present group of implementations, to which the immediately preceding discussion applies, it is required that the load cells be relatively rigid, with displacements of at most a few thousandths of an inch under working load.

Cantilever structures, as shown in FIG. 2a through 2d will now be described. The cantilever beams 1, which carry the anvils (3 in FIG. 2c and 3a–3d in FIG. 2a) on their outer ends, are bent by the applied force. The distinguishing feature of this class of embodiments is that the element 1 which resists the key force is distinct from the sensor proper 12.

Now, strain gauge sensors will be described as an example of the cantilever structure shown in FIGS. 2a–2d. The resulting strain in one or more surfaces of the beam is detected as the resulting change in the resistance of an attached strain gauge, by well-known techniques. Miniature semi-conductor strain gauges are appropriate for this function. Four gauges 12, one on the upper or lower surface of each beam, will provide the vertical forces; gauges similarly located on the sides of the beams will give axial torque, if required. Conventional techniques would require at least two gauges, on opposite surfaces, with perhaps two more oriented across the direction of strain, for precision measurement, temperature compensation, etc. However for the present purposes, especially if only the horizontal component of the applied force is required to be measured, one on each beam suffices; since the four gauges so used are in similar temperature environments, they can be made to be mutually compensating. If the vertical and torque forces are required, more gauges may be required for high accuracy and/or temperature compensation. The resistances may be measured and the resulting signals completely or partially processed by integrated circuitry located on the chip, or by circuitry located at a distance, and connected by an appropriate cable, which can be small enough to fit into the free space in most current keyboards.

In FIGS. 2a–2d, the reference numeral 2 refers to a rigid base of the cantilever assembly. Reference numeral 4 refers to a rigid part of the base which does not appreciably move. The part 4 simply connects the cantilever arm 1 to the base 2. The parts 1, 2 and 4 are all one piece. Reference number 13 represents the gap that exists between the cantilever arm 1 and the base 2. Reference numerals 6–10 show terminal points which are holes for receiving the necessary wiring used to relate information from the strain gauges 12 to the outside of the sensor chip. Reference numeral 25 refers, in general, to the cantilever-type embodiment.

In FIG. 2a, the reference number 5 refers to a section of the base 2 which is hollowed out so as to be able to accommodate the conventional lower part 15 of the key-mechanism of a keyboard base 16 as shown in FIG. 2d.

FIGS. 2a through 2d show a plan view, an end view, a side view and a perspective view, respectively, of the cantilever-type embodiment of the present invention.

FIG. 2d also shows the relationship between the inventive cantilever-type sensor assembly and a conventional key assembly of a data entry keyboard. As shown in FIG. 2d, the inventive cantilever-type sensor assembly is simply placed in between the conventional key cap 14 and the conventional lower part 15 of the key mechanism of the keyboard base 16. Therefore, according to the present invention, existing keyboards may be easily retrofit to accommodate the cursor moving function.

The above-described cantilever-type embodiment may use other types of sensors besides strain gauge sensors. The following is a list of other types of sensors which may be used as alternative to the strain gauge sensors described above.

a. Piezo-electric sensors: A strip of piezo-electric material is bonded to one or more surfaces of each beam, as in the strain gauge case. Bending of the beam results in both bending and stain in the piezo-electric material, with resultant displacement of charge. This is detected either as a voltage or directly by an operational amplifier in an integrator mode, the resulting signal providing the required force measurement.

b. Magnetic reluctance sensors: A magnetic flux circuit runs through the cantilever arm 1, the gap 13 between the anvil end of the arm and the base 2, the base 2, and the anchorage 4 of the arm. Flux is supplied by a permanent magnet located in any part of this circuit (except the gap), most conveniently the base 2. All of these parts are composed of a material with high magnetic permeability, such as permalloy. Movement of the arm 1 results in a change in the gap, with resultant change in the flux in the circuit; this change results in a voltage in a coil surrounding some part of the circuit remote from the permanent magnet. This is input to an integrating operational amplifier, or circuit with similar function, the output of which gives a measure of the position of the anvil, and hence of the force on it. This is similar in principle to the familiar 'variable reluctance' phonograph pickup.

c. Variable inductance sensors: A coil is located in the base 2 immediately below the end of cantilever arm 1 carrying the anvil 3, and the bottom of that arm carries a high-permeability 'core' which is inserted into and withdrawn from the coil as the arm moves up and down. The resulting variation in the inductance of the coil from its value in the 'zero' position of the arm is detected by any of the well-known circuits for this purpose.

d. Variable capacitance sensors: One plate of a capacitor is located on the base 2 under the end of the cantilever arm 1 carrying the anvil 3, and the other is located on the lower surface of that arm. The capacitance varies with the position of the arm, and its deviation from the 'zero' condition may be measured by any of the well-known methods. Due to the small size of the capacitance in question and the magnitude of stray effects, it is desirable to locate the first stage of the required circuitry on the chip, in proximity to the sensor.

In most of these cases, drift may occur, and it will be desirable to reset the detector circuitry to zero whenever it is known that the force on the anvils is zero, for example when the key is in its 'up' position. This drift correction will be described with respect to the next group of embodiments to be discussed below.

The next group of embodiments relate to direct compression load cells. Here the sensor elements themselves support the key forces. Most of these only measure force in the −z direction, and do not easily provide the torque component. The cantilever-type embodiments provide for much more versatility, in terms of degrees of freedom.

Figure 1B:
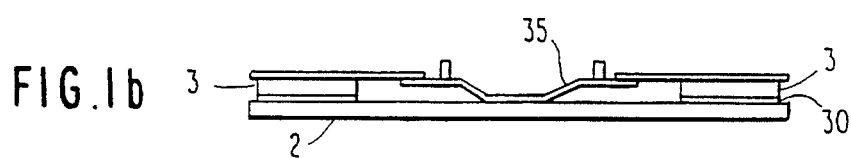

With respect to the direct compression load cells, the first embodiment uses piezo-electric sensors. A layer 30 of piezo-electric material as shown in FIG. 1b (e.g. a barium titanate formulation such as PZT8 or PZT15) located directly under each anvil 3, and activated by direct compression, supplies an adequate signal to drive a very-high-impedance input amplifier such as an FET operational amplifier as is well known in the art. By operating the amplifier in its integrator mode, with the input (and the voltage across the piezo-electric material) held at zero, problems of drift and leakage are minimized. The resulting sensing structure is simple, very thin, and has a stable, robust output giving an accurate measurement of downward force on the four anvils. Problems of temperature sensitivity are minimized if only the horizontal components of the key force are required, due to mutual compensation among the four sensors.

Another feature of the invention will now be described with respect to FIG. 1b. This feature has as its goal to correct drift problems that occur with respect to the voltage developed across the piezo-electric material. More specifically, in the past it was difficult to get the voltage back to zero when an operator takes her hand off of a key. In FIG. 1b, when a key is pushed down a shorting switch 35 moves away from the piezo-electric material and an open circuit is created between the piezo-electric material and ground. When an operator takes her finger off of the key, a short circuit is created by the shorting switch 35 between the piezo-electric material and ground.

In the direct compression load cell embodiment discussed above and diagrammed in FIGS. 1a and 1b, the sensor elements were described as being piezo-electric sensors. Other types of sensors may also be used; the following are examples of other types of direct compression load cell sensor types.

1. Piezo-resistive sensors: A layer of material located directly under the anvil responds to applied force and the resulting compression with a change in resistance, which is measured by well-known means to provide the required force measurement. Candidate materials are 1. properly doped and oriented silicon crystal, as in the available semiconductor stain gauges, and 2. any of a number of variations on the venerable scheme of the carbon microphone, including stacked and random graphite fibers, plastic foams coated with graphite, and various 'conductive rubber' formulations which provide a fine-grained array of conductors, more or fewer of which are contacted depending on the force applied.

2. Resistive fluid sensors: Movement of the anvil displaces fluid from a thin layer beneath it. The displaced fluid moves into a pressurized reservoir—an elastic bladder and a gas-filled enclosed space are two possibilities; the pressure of the fluid carries the load of the key forces, and the thickness of the layer under an anvil is a measure of the force on that anvil. The thickness can be measured, for example by:

a. the electrical resistance through the layer, using a fluid with an appropriate conductivity (e.g. a weak electrolyte). The signal processing requirement are identical to those of other sensors using piezo-resistance.

b. the optical thickness of the layer, using a fluid of appropriate opacity. Measurement can be by a light source and detector in the base, with the upper surface of the fluid cavity (the bottom of the anvil) made reflective, or alternatively with either light source or detector placed in the anvil structure.

c. the fluid may be a gas of appropriate opacity, in a bellows, piston, or bladder structure. Bromine comes to mind, though something less chemically active would be preferable.

There are certain drawbacks to the use of a key as the analog input device, principally that some signal must be given to the computer as to how to interpret forces applied to it—when is it a key, and when a joystick. For example, a mode key must be depressed. Therefore, three further alternative classes of embodiments of the idea, 'analog input device within or near the primary typing area' will be now disclosed in which there is no need for the use of a mode key.

1. A fixed joystick, to be operated by the fingertip, located in a suitable position on the keyboard, for example in the space between the G and H keys of a standard QWERTY keyboard, and extending up approximately to, or slightly above, the level of the key caps in their normal, or up, position. Some minor modification of the adjoining keycaps may be required. In this position it will not interfere with normal typing, nor is it likely to be hit accidentally, and may function as a normal joystick, in much the same way as the key joysticks disclosed above, but without the need for mode switching. The joystick may also be located between two thumb-activated keys on a keyboard commonly used in airplanes. The simplest implementation of the fixed joystick is probably as a simple shaft, anchored in the keyboard base, with piezo-resistive miniature strain gauges on its four sides. Other implementations could involve placing one of the sensor apparatuses of FIGS. 1 and 2 or any other variation discussed above in between two keys of a keyboard and using a joystick to apply forces to the sensor apparatus. It can be implemented as an add-on, inserted into an existing keyboard with at most modification of the adjacent key caps.

2. In case the fixed joystick turns out to be a hazard in typing after all, being struck accidentally while typing, a possible variant is a joystick which will pop up when a mode signal is triggered in a convenient position between the keys. This however does require the mode-switch signal, which is the principle drawback of the use of a key as a joystick. Its implementation is fairly routine, using a solenoid for erection.

3. Finally, a conventional miniature joystick can be located adjacent to the primary typing area, for example just above and to the right, permitting simultaneous use of the joystick and (one-handed) typing. Again, any of the above implementation technologies may be used, with additional freedom from space restrictions. An extension piece could be attached to the keyboard to place the joystick below the space bar, for example, thus allowing an existing keyboard to be easily retrofitted.

Figure 3:
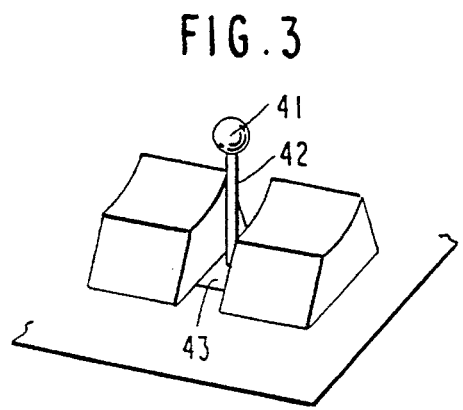
FIG. 3 shows one embodiment of a joystick according to the present invention.

In the embodiments just discussed above, the joysticks mentioned may be of two different types. One type of joystick has, at the top, a small sphere that can be grabbed on to. The small sphere 41 as shown in FIG. 3 is mounted on a stalk 42. The sphere may be easily manipulated with the fingertips to provide for all six degrees of freedom with an appropriate array of sensors located either inside the sphere or in the base, such services measuring forces between the sphere and its mounting. A sensor assembly 43 may be provided, such a sensor assembly being of the same type of the assembly 25 of FIG. 2d or any other of the sensor assemblies described above.

Figure 4:
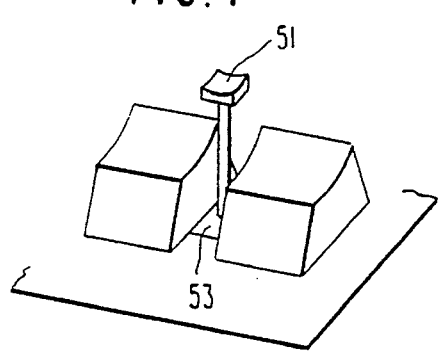
FIG. 4 shows another embodiment of a joystick according to the present invention.

Another embodiment of the joystick may be used by users who prefer not to grab onto the joystick with more than one finger (or a finger and a thumb), as in the embodiment of FIG. 3, but instead to guide the joystick by placing a single finger on the top of the joystick. Such an embodiment is shown in FIG. 4. In FIG. 4, the top 51 of the joystick is shaped with a cup-like shape so as to conform to a finger tip. Thus, a finger tip will fit comfortably in the joystick top 51. A sensor assembly 53 may be either the same type as the assembly as of FIG. 2d or any other of the sensor assemblies described above.

In using the above described sensor assembly 25, for example, with the joystick embodiment of FIG. 3, the sensor assembly 25 of FIG. 2d would sense the six degrees of freedom of movement of the joystick (41, 42) instead of that of the key cover 14.

The present invention is not to be limited by the above-described embodiments but only by the scope of the appended claims.

What is claimed:

1. A joystick for entering input data into a computer, said joystick being located in between adjacent keys of a plurality of keys in a primary typing area of a standard QWERTY keyboard.

2. A joystick as claimed in claim 1 wherein said joystick has a substantially spherical handle.

3. A joystick as claimed in claim 1 wherein said joystick has a substantially cup-shaped handle.

4. A joystick as claimed in claim 1 wherein all of said keys have the standard spacing of said standard QWERTY keyboard, and wherein said adjacent keys include the G and the H keys of said standard QWERTY keyboard, said keyboard being non-split.

5. A joystick as claimed in claim 1 wherein said two keys are adjacent thumb-activated keys on a keyboard commonly used in airplanes.

6. A joystick as claimed in claim 4, wherein said adjacent keys are modified only in shape relative to a shape of other keys in said plurality of keys located in said primary typing area, in order to form a gap between said standardly spaced adjacent keys to accommodate said joystick.

7. A joystick for entering input data into a computer, said joystick being located in between two adjacent keys of a plurality of standardly spaced keys located in a primary typing area of a standard QWERTY keyboard, said adjacent keys being separated by a gap having a width that is less than a width of any of said adjacent keys.

8. A joystick as claimed in claim 7, wherein said standardly spaced adjacent keys are modified only in shape relative to other keys located in the primary typing area, in order to form said gap to accommodate said joystick.

9. A joystick as claimed in claim 7, wherein said adjacent keys are alphanumeric keys of said standard QWERTY keyboard.

10. A joystick as claimed in claim 7, wherein a spacing of said adjacent keys is a standard spacing of a keys of a QWERTY keyboard.

11. A keyboard for entering data into a device, said keyboard being a standard QWERTY keyboard, and comprising: a plurality of adjacent keys having a standard spacing relative to each other; and a joystick located in between at least two of said adjacent keys so that said standard spacing is maintained between said at least two adjacent keys.

12. A data entry device for entering data into a computer, comprising: at least two keys; and a joystick located in between said at least two keys, there being a gap between said at least two keys that is less than a width of each of said at least two keys.

13. In combination:

a standard QWERTY keyboard comprising a plurality of keys located within a primary typing area; and a joystick disposed in between adjacent keys within the primary typing area of said standard keyboard, said joystick comprising a shaft which extends vertically from the primary typing area.

14. The combination of claim 13, wherein:

said adjacent keys are the G and H keys of said standard keyboard.

15. A computer having a keyboard, wherein said keyboard is a standard QWERTY keyboard and comprises: a plurality of adjacent keys having a standard spacing relative to each other; and a joystick located in between at least two of said adjacent keys such that said standard spacing is maintained between said at least two adjacent keys.

* * * * *